: US 7,458,282 B1
(45) Date of Patent: Dec. 2, 2008

(12) United States Patent
Wuester, Sr. et al.

(54) SCREWDRIVER COMPRISING A SLIDER HAVING AN ATTACHED SCREW BIT AND A POSITION DETECTOR FOR POSITION FEEDBACK (75) Inventors: David Wuester, Sr., San Jose, CA (US); Reza Ray Mehr, Fremont, CA (US); Michael S. Quam, Morgan Hill, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 30 days.

(21) Appl. No.: 11/602,652

(22) Filed: Nov. 21, 2006

(51) Int. Cl.
*G01L 5/24* (2006.01)
(52) U.S. Cl. ............... 73/862.23; 73/862.21; 414/751.1
(58) Field of Classification Search ............ 73/862.21, 73/862.23; 318/560; 703/1; 414/749.1, 414/751.1; 901/16
See application file for complete search history.

(56) References Cited

U.S. PATENT DOCUMENTS

| | | | |
|---|---|---|---|
| 4,669,359 A * | 6/1987 | Shiba ........................ 91/361 |
| 4,790,234 A * | 12/1988 | Hampejs et al. ............ 91/362 |
| 4,800,325 A | 1/1989 | Nakanishi |
| 4,813,312 A | 3/1989 | Wilhelm |
| 4,881,435 A | 11/1989 | Hansson |
| 4,908,926 A | 3/1990 | Takeshima et al. |
| 4,922,436 A | 5/1990 | Dohm et al. |
| 5,010,286 A | 4/1991 | Nakamura et al. |
| 5,019,763 A | 5/1991 | Komatsu |
| 5,059,089 A * | 10/1991 | Kocaoglan ............... 414/744.6 |
| 5,121,558 A | 6/1992 | Caroe et al. |
| 5,154,242 A | 10/1992 | Soshin et al. |
| 5,170,852 A | 12/1992 | Shikata et al. |
| 5,215,270 A | 6/1993 | Udocon et al. |
| 5,270,625 A * | 12/1993 | Neff ........................... 318/560 |
| 5,289,886 A | 3/1994 | Shikata et al. |
| 5,345,766 A * | 9/1994 | Leonhartsberger et al. .... 60/545 |
| 5,511,933 A * | 4/1996 | Herklotz ................... 414/749.1 |
| 5,549,169 A | 8/1996 | Matsumura et al. |
| 5,631,823 A | 5/1997 | Layer et al. |

(Continued)

OTHER PUBLICATIONS

Microtec Systems, "Microdrive G4, Screwdriver System User's Manual", Microtech Systems GmbH, Ver.0.93, Nov. 11, 2005, pp. 1-35.

(Continued)

*Primary Examiner*—Edward Lefkowitz
*Assistant Examiner*—Freddie Kirkland, III
(74) *Attorney, Agent, or Firm*—Stuart B. Chinn, Esq.; Howard H. Sheerin, Esq.

(57) ABSTRACT

A screwdriver is disclosed comprising a base, a carriage moveably coupled to the base, an actuator operable to move the carriage relative to the base, and a slider comprising an attached screw bit, wherein the slider is coupled to the base through the carriage and the slider is moveably coupled to the carriage such that the slider and attached screw bit move together relative to the carriage. The screwdriver further comprises a position detector operable to detect a position of the slider relative to the carriage. In one embodiment, the carriage is moved relative to the base to move the screw towards the work surface. After the screw contacts the work surface, the carriage is moved further relative to the base causing the slider to move relative to the carriage, and the movement of the slider relative to the carriage is detected using the position detector.

16 Claims, 10 Drawing Sheets

U.S. PATENT DOCUMENTS

| | | |
|---|---|---|
| 5,708,586 A | 1/1998 | Ikeda |
| 6,247,387 B1 | 6/2001 | Ketteringham |
| 6,497,036 B1 | 12/2002 | Jenkins et al. |
| 6,680,595 B2 | 1/2004 | Ito |
| 6,681,659 B2 | 1/2004 | Hoe et al. |
| 6,701,212 B2 | 3/2004 | Shiba et al. |
| 7,077,621 B2 * | 7/2006 | Ruden ..................... 414/751.1 |
| 2005/0196264 A1 * | 9/2005 | Ruden ..................... 414/749.1 |

OTHER PUBLICATIONS

Microtec Systems, "Components and Systems for Total Process Controlled Screw Tightening", Microtec Systems Torque Competence, 2005/2006, pp. 1-30.

* cited by examiner

SCREWDRIVER COMPRISING A SLIDER HAVING AN ATTACHED SCREW BIT AND A POSITION DETECTOR FOR POSITION FEEDBACK

BACKGROUND OF THE INVENTION

1. Field of the Invention

The present invention relates to screwdrivers. More particularly, the present invention relates to a screwdriver comprising a slider having an attached screw bit and a position detector for position feedback.

2. Description of the Prior Art

Automated screwdriver systems have been employed in mass production of various devices, such as a disk drive comprising a head stack assembly (HSA) that is fastened to a base, and a cover fastened to the base. The screw driving process typically comprises a "search step" wherein the screw is moved toward the work surface while turning at a low rotations per minute (RPM). When the threads of the screw begin to engage the work surface, the torque of the screwdriver will typically increase beyond an engagement torque threshold. Once the threads have engaged the work surface, as indicated by the torque exceeding the engagement torque threshold, the screw is rotated at a high RPM during an "angle step" to expedite the screw driving process. After a predetermined number of revolutions (angular driving degrees), the screw is rotated at a medium RPM to apply a final torque to the screw during a "torque step." The screw driving process is considered complete when the torque exceeds a final torque threshold.

A number of problems have been identified with the above-described prior art screwdrivers. First, for small screws the engagement torque may be too small to detect, and therefore the screwdriver may never transition into the high RPM angle step. That is, the screw may be screwed completely into the work surface using the low RPM of the search step, which can significantly increase the screw driving time, and/or the screw driving process may fail altogether. Another problem is that at the end of the screw driving process, the prior art screwdrivers may not be capable of accurately verifying the final position of the screw relative to the work surface. Thus, for example, if the torque applied by the screwdriver exceeds the final torque threshold due to cross-threading, the prior art screwdrivers may not be capable of detecting this error condition.

There is, therefore, a need for a screwdriver capable of detecting when the screw has contacted the work surface in order to transition into a high RPM angle step. There is also a need for a screwdriver capable of verifying the final position of the screw relative to the work surface.

SUMMARY OF THE INVENTION

An embodiment of the present invention comprises a screwdriver including a base, a carriage moveably coupled to the base, an actuator operable to move the carriage relative to the base, and a slider comprising an attached screw bit, wherein the slider is coupled to the base through the carriage and the slider is moveably coupled to the carriage such that the slider and attached screw bit move together relative to the carriage. The screwdriver further comprises a position detector operable to detect a position of the slider relative to the carriage.

In one embodiment, the position detector comprises an encoder, and in one embodiment an optical encoder. In one embodiment, the encoder comprises a first component coupled to the carriage and a second component coupled to the slider. For example, in one embodiment the encoder comprises an emitter operable to emit light and a detector operable to detect the light, the emitter and detector coupled to the carriage, and the slider comprises a pattern operable to reflect the light. In an alternative embodiment, the encoder comprises an emitter operable to emit light and a detector operable to detect the light, the emitter and detector coupled to the slider, and the carriage comprises a pattern operable to reflect the light.

Another embodiment of the present invention comprises a method of operating a screwdriver to fasten a screw to a work surface, the screwdriver comprising a base, a carriage moveably coupled to the base, an actuator operable to move the carriage relative to the base, and a slider comprising an attached screw bit, wherein the slider is coupled to the base through the carriage and the slider is moveably coupled to the carriage such that the slider and attached screw bit move together relative to the carriage. The screw driver further comprises a position detector operable to detect a position of the slider relative to the carriage. The carriage is moved relative to the base to move the screw toward the work surface, and a relative movement between the slider and the carriage is detected using the position detector.

DESCRIPTION OF THE PREFERRED EMBODIMENTS

Figure 1A:
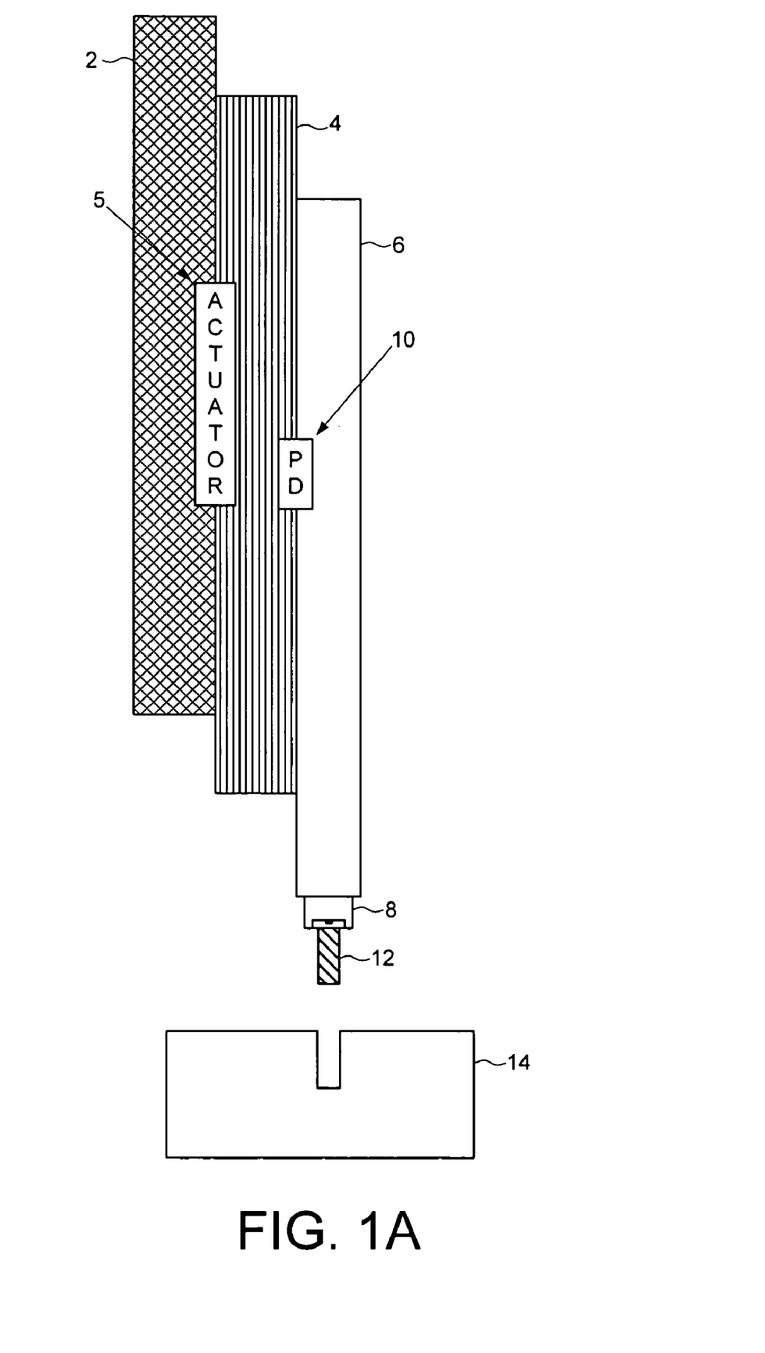
FIG. 1A shows a screwdriver according to an embodiment of the present invention comprising a base, a carriage moveably coupled to the base, an actuator for moving the carriage relative to the base, a slider and attached screw bit moveably coupled to the carriage, and a position detector operable to detect a position of the slider relative to the carriage.

FIG. 1A shows an embodiment of the present invention comprising a screwdriver including a base 2, a carriage 4 moveably coupled to the base 2, an actuator 5 operable to move the carriage 4 relative to the base 2, and a slider 6 comprising an attached screw bit 8, wherein the slider 6 is coupled to the base 2 through the carriage 4 and the slider 6 is moveably coupled to the carriage 4 such that the slider 6 and attached screw bit 8 move together relative to the carriage 4. The screwdriver further comprises a position detector 10 operable to detect a position of the slider 6 relative to the carriage 4.

Any suitable base 2 may be employed in the screwdriver, such as the base of a free standing robotic machine which may be mounted to the floor of an assembly room. The base may be fixed relative to the floor, or it may be moveably coupled to the floor through a suitable mechanism such as a gantry. In another embodiment, the base 2 of the screwdriver may comprise the base of a hand tool, such as the housing of a hand tool. In addition, any suitable carriage 4 may be employed, such as a metal plate coupled to the base using suitable bearings, hydraulics, pneumatics, etc., and any suitable slider 6 may be employed, such as an assembly comprising a shaft and motor for rotating the screw bit 8. The screw bit 8 may comprise any suitable configuration for engaging any suitable fastener, such as a Phillips or flathead screw bit, or a hex-head or hex-screw type screw bit. In one embodiment, the screw bit 8 is interchangeable so that the appropriate screw bit may be installed for a particular application.

The actuator 5 for moving the carriage 4 relative to the base 2 may comprise any suitable mechanics, such as an AC or DC motor or pneumatic motor, suitable hydraulics, gears, belts, springs, bearings, tracks, etc. In one embodiment, the actuator 5 may be actuated manually by an operator, such as manually levered. Similarly, the slider 6 may be moveably coupled to the carriage 4 using any suitable mechanics, such as suitable hydraulics, gears, belts, springs, bearings, tracks, etc. The slider 6 may be actuated actively using a suitable motor, or actuated manually by an operator. In an embodiment described below, the slider 6 is passively coupled to the carriage 4 such that the slider 6 moves relative to the carriage 4 after the screw contacts the work surface. The screw bit 8 may also be rotated actively using any suitable mechanics, such as through an AC or DC motor rotating a shaft.

Figure 6:
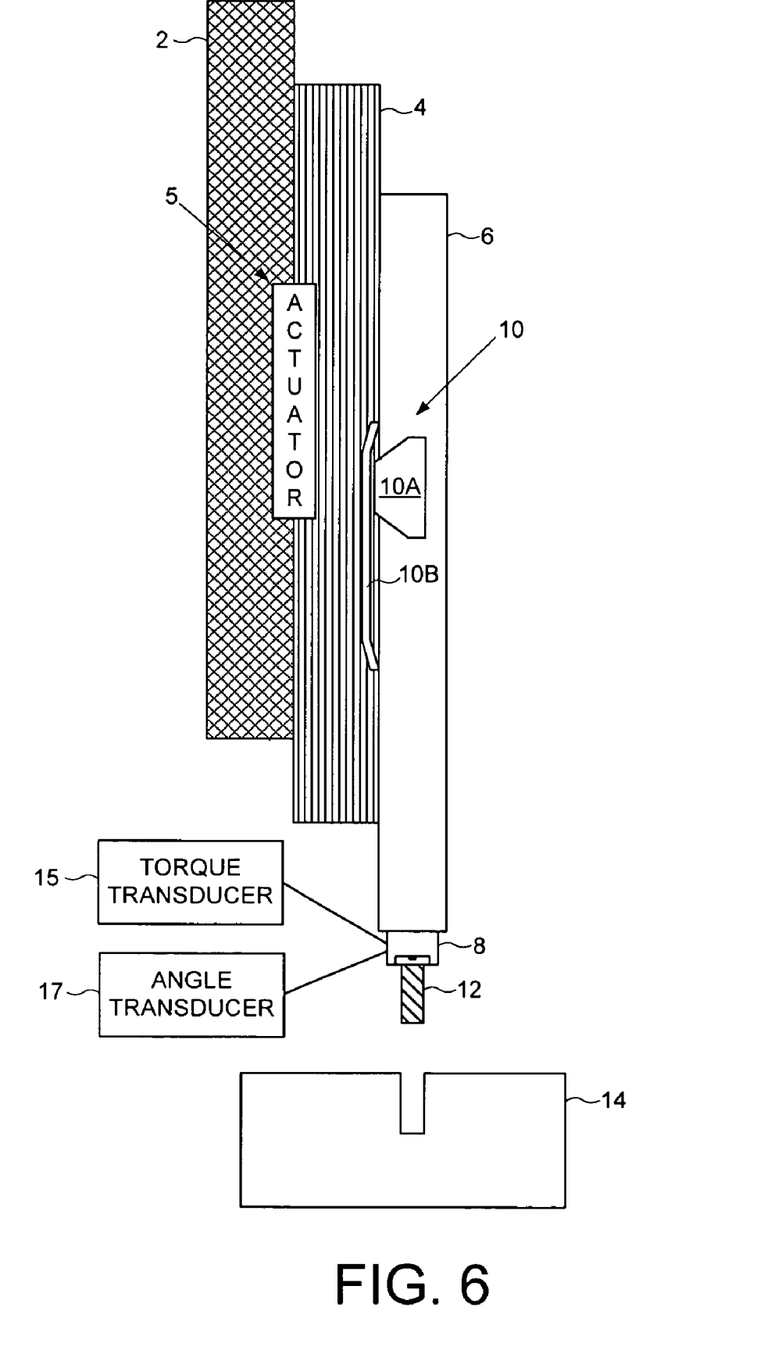
FIG. 6 shows an embodiment of the present invention wherein the emitter/detector of the decoder is attached to the slider and the carriage comprises a pattern operable to reflect light.

In one embodiment, the screwdriver further comprises a suitable torque transducer 15 (FIG. 6) for measuring a torque applied to the screw bit 8. The torque transducer may comprise any suitable transducer mechanism, such as a strain gauge transducer, magnetoelastic transducer, or piezoelectric transducer. The screw driver may also comprise a driving angle transducer 17, such as a suitable back electromotive force (BEMF) transducer, for measuring the driving angle of the screw bit 8.

Any suitable position detector 10 for detecting the position of the slider 6 relative to the carriage 4 may be employed in the embodiments of the present invention, such as one or more optical or magnetic switches, or a more complex optical or magnetic encoder. An encoder may comprise any suitable geometry, such as a linear encoder or a rotary encoder, and it may operate in any suitable manner. In one embodiment, the position detector 10 comprises an absolute encoder which generates a unique position signal that is available anywhere along the path of travel. In another embodiment, the position detector 10 comprises an incremental encoder which is initialized at a predetermined position along the path of travel and then outputs an incremental signal (e.g., a square wave) representing incremental movement along the path of travel.

In one embodiment, the screwdriver comprises suitable control circuitry for processing the output of the position detector 10, such as suitable state machine circuitry and/or a microprocessor executing steps of a control program. The control circuitry may also generate suitable control signals for controlling the positioning of the components of the screwdriver (for example, for moving the carriage 4 relative to the base 2). In another embodiment, such control circuitry may comprise a separate component coupled to the screwdriver.

Figure 1B:
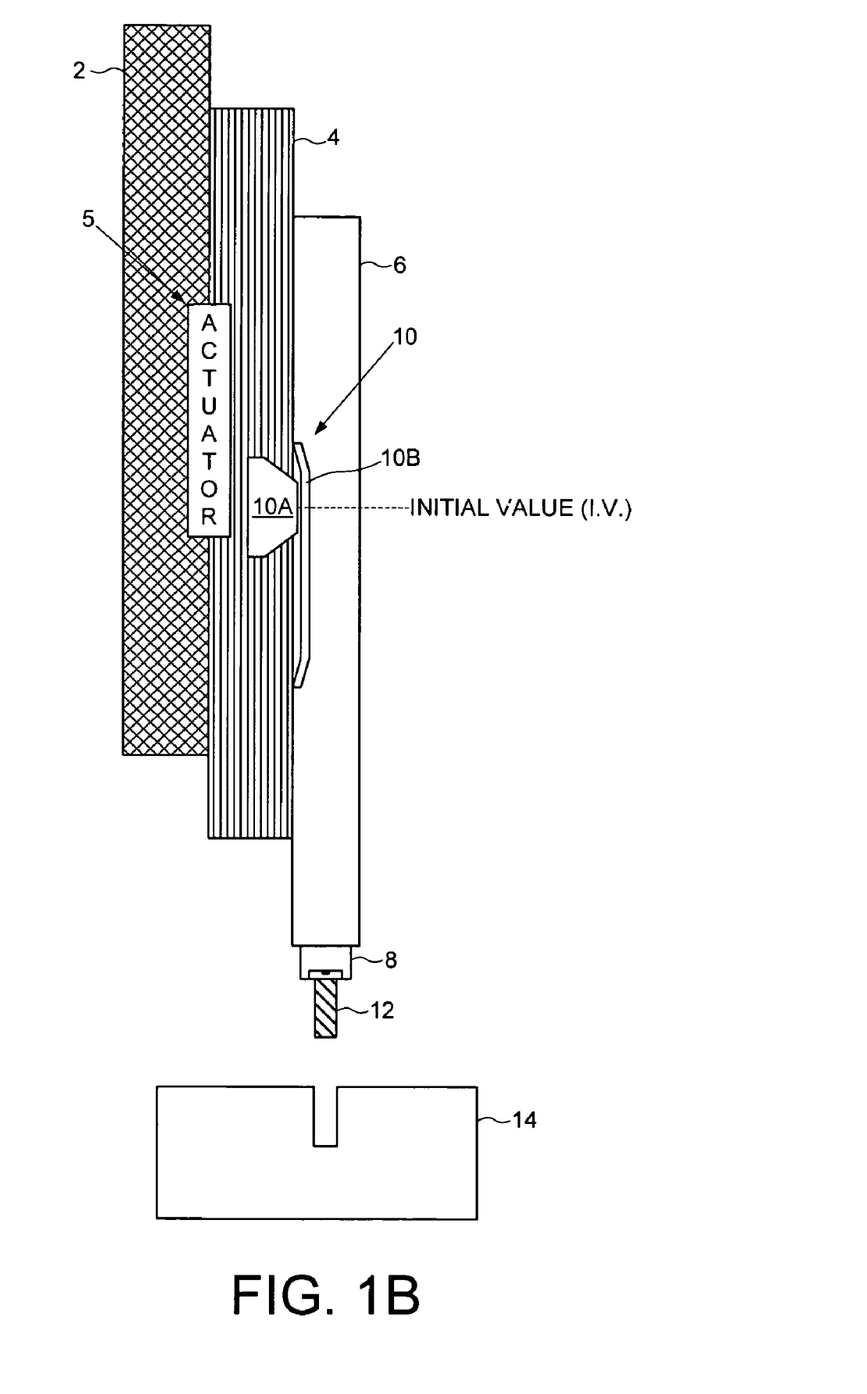
FIG. 1B shows a screwdriver according to an embodiment of the present invention wherein the position detector comprises an encoder.

In one embodiment, the position detector 10 comprises an encoder including a first component coupled to the carriage and a second component coupled to the slider. For example, in an embodiment shown in FIG. 1B, the position detector 10 comprises an optical encoder including a first component 10A coupled to the carriage 4 and a second component 10B coupled to the slider 6. The first component 10A comprises an emitter operable to emit light and a detector operable to detect the light, and the second component 10B comprises a pattern operable to reflect the light. In an alternative embodiment shown in FIG. 6, the first component 10A comprising the emitter and detector is coupled to the slider 6, and the second component 10B comprising the pattern operable to reflect the light is coupled to the carriage 4. In other embodiments, the first component 10A may comprise the emitter, and the second component 10B may comprise the detector.

In the embodiment of FIG. 1A, the screwdriver comprises a suitable actuator 5 (e.g., a stepper motor) for moving the carriage 4 relative to the base 2 along the z-axis, whereas the slider 6 is moveably coupled to the carriage 4 passively. In other words, the slider 6 may move relative to the carriage 4 along the z-axis, but no mechanism on the screwdriver directly controls this relative movement. Thus, in FIG. 1A, the slider 6 is shown at a lower limit of its z-axis range of travel relative to the carriage 4, since it is pulled by gravity to this lower limit.

Figure 2:
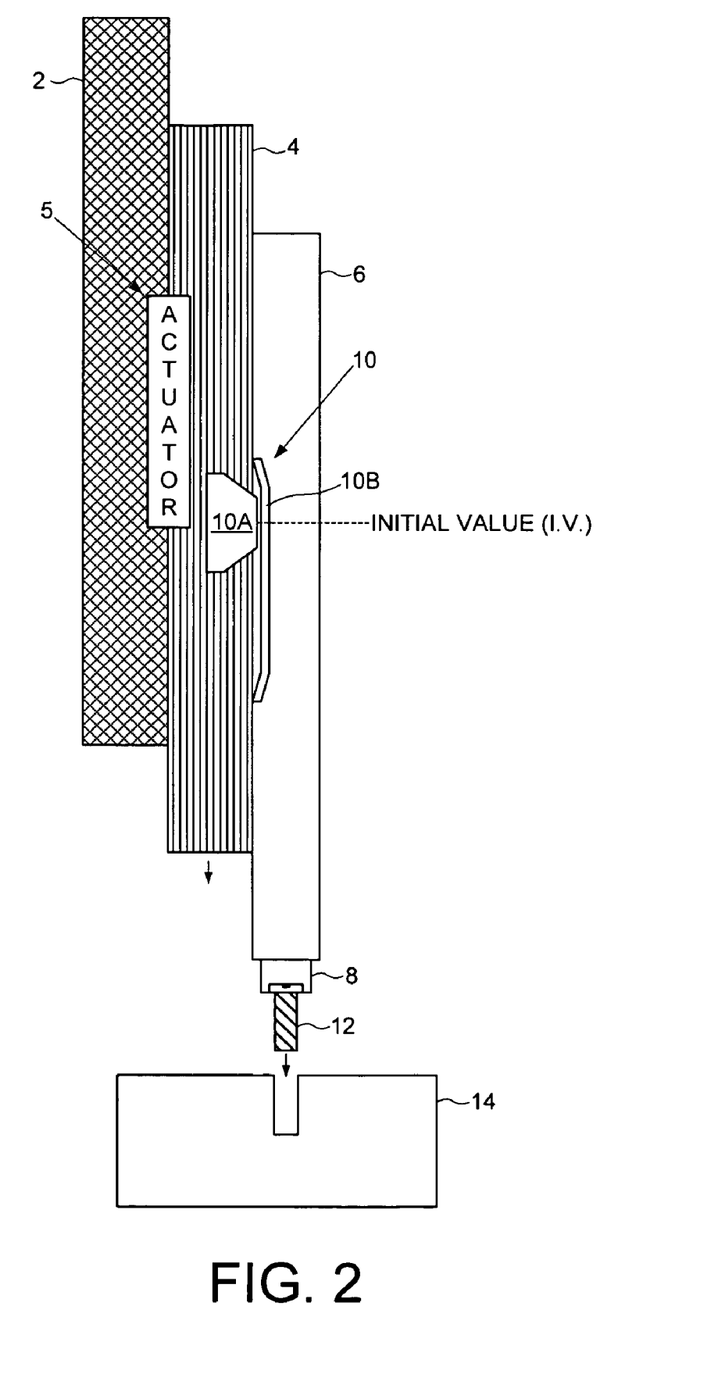
FIG. 2 illustrates the carriage moving relative to the base to move the screw toward the work surface.

In one embodiment, during a screw driving process, the carriage 4 is moved relative to the base 2 to move a screw 12 toward a work surface 14 during a search step as illustrated in FIG. 2. When the screw 12 contacts the work surface 14, the slider 6 slides relative to the carriage 4 upward in the vertical direction, as the carriage 4 moves further downward (see FIG. 3). In other embodiments, the carriage 4 may be otherwise moveably coupled to the base 2, and the slider 6 may also be differently coupled to the carriage 4.

Figure 3:
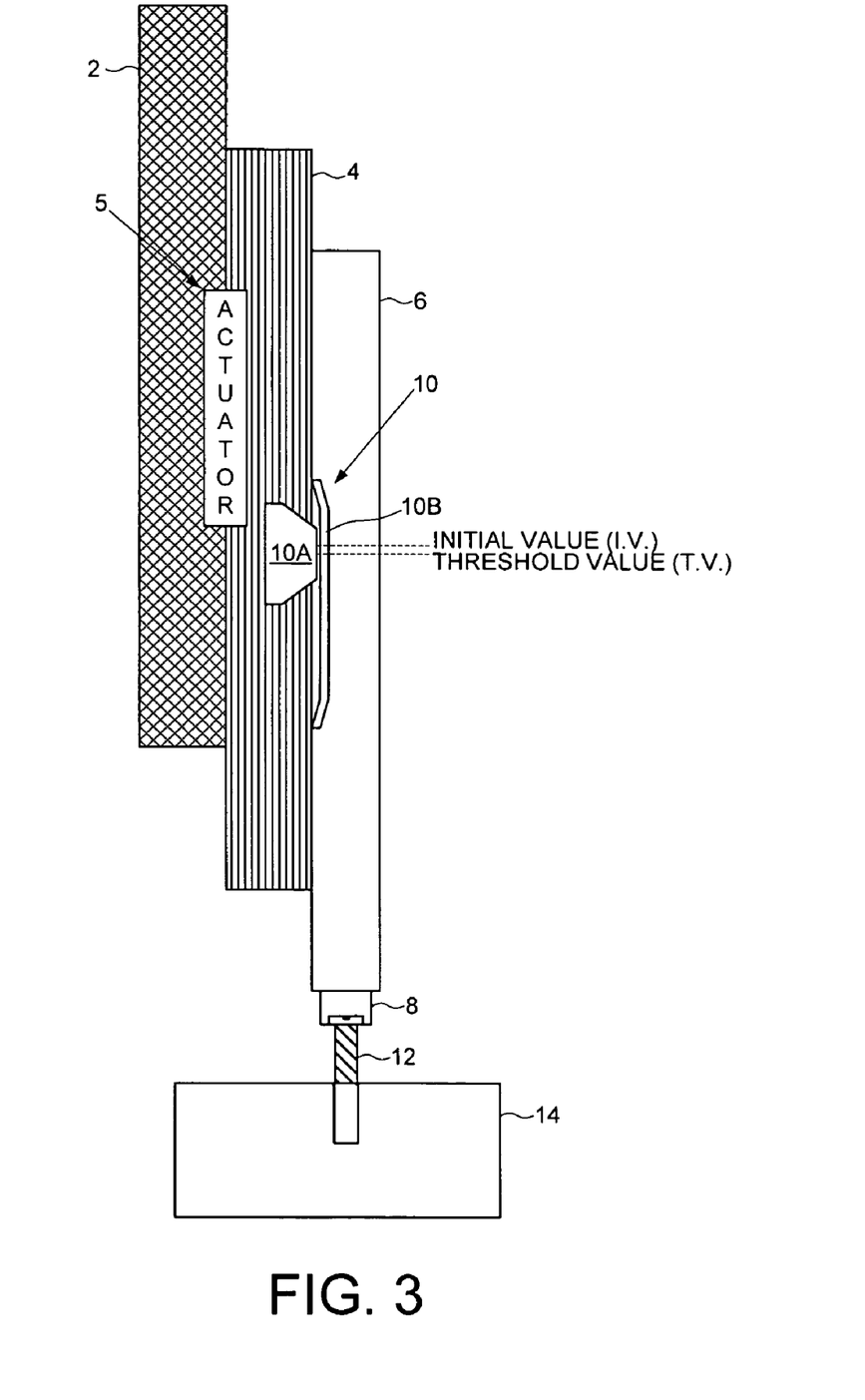
FIG. 3 shows the slider moving relative to the carriage after the screw contacts the work surface as detected by the encoder, wherein the screwdriver transitions into a high RPM mode.

In one embodiment, in order to help maintain a proper vertical alignment of the screw 12, the screw 12 is rotated at a low RPM while moving the screw toward the work surface 14 during the search step. The encoder 10 output remains at an initial value (I.V.) until the initial contact between the screw 12 and work surface 14 (the carriage 4 and slider 6 move together). When the screw 12 contacts the work surface 14 as illustrated in FIG. 3, the carriage 4 continues to move relative to the base 2 (vertically downward in this example) resulting in a relative movement between the slider 6 and the carriage 4 as detected using the encoder 10. When the encoder 10 output reaches a position threshold value (T.V.) as shown in FIG. 3, the screwdriver transitions into a high RPM angle step wherein the screw 12 is rotated at a high RPM in order to screw the screw 12 into the work surface 14. This high RPM angle step may be initiated before or after the screw has begun threading into the work surface. In other embodiments, the encoder 10 output may not be used for transitioning to the high RPM angle step, relying instead on some other feedback mechanism, or for example on a set transition time.

Figure 4:
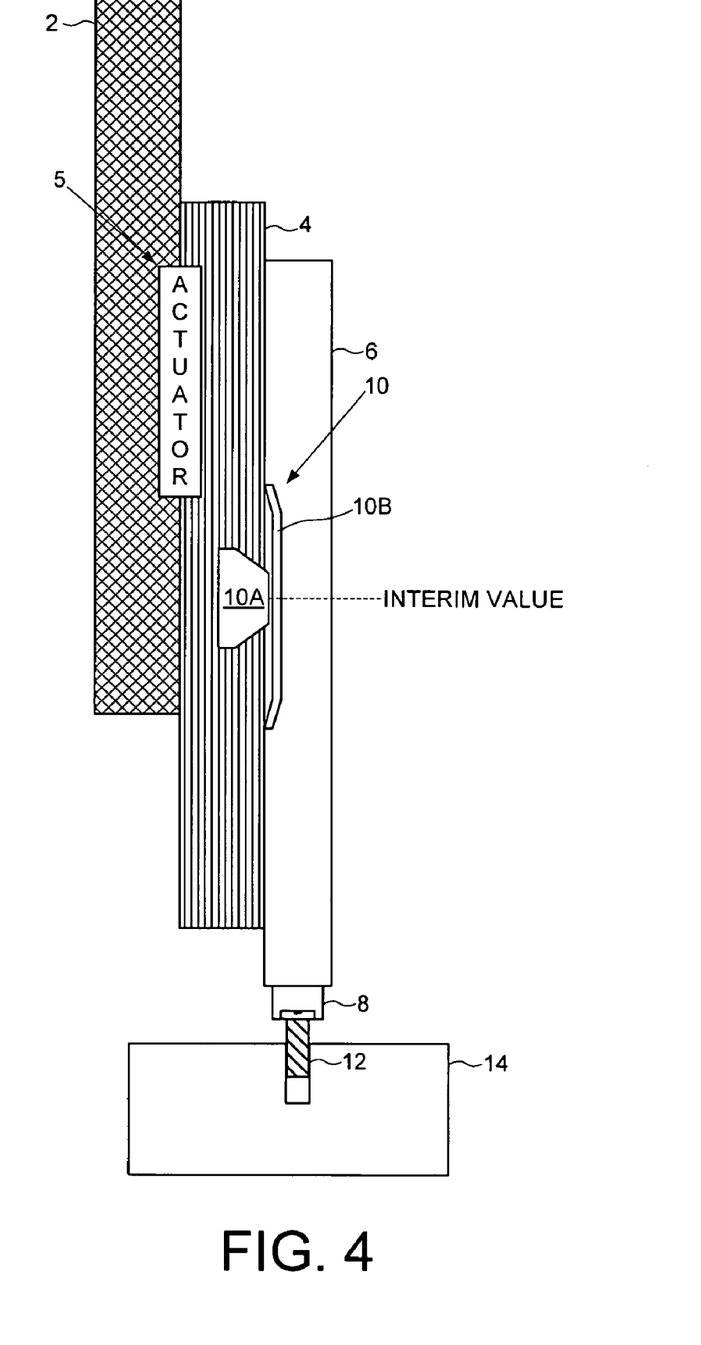
FIG. 4 shows an interim position of the screw and corresponding encoder value.
Figure 5:
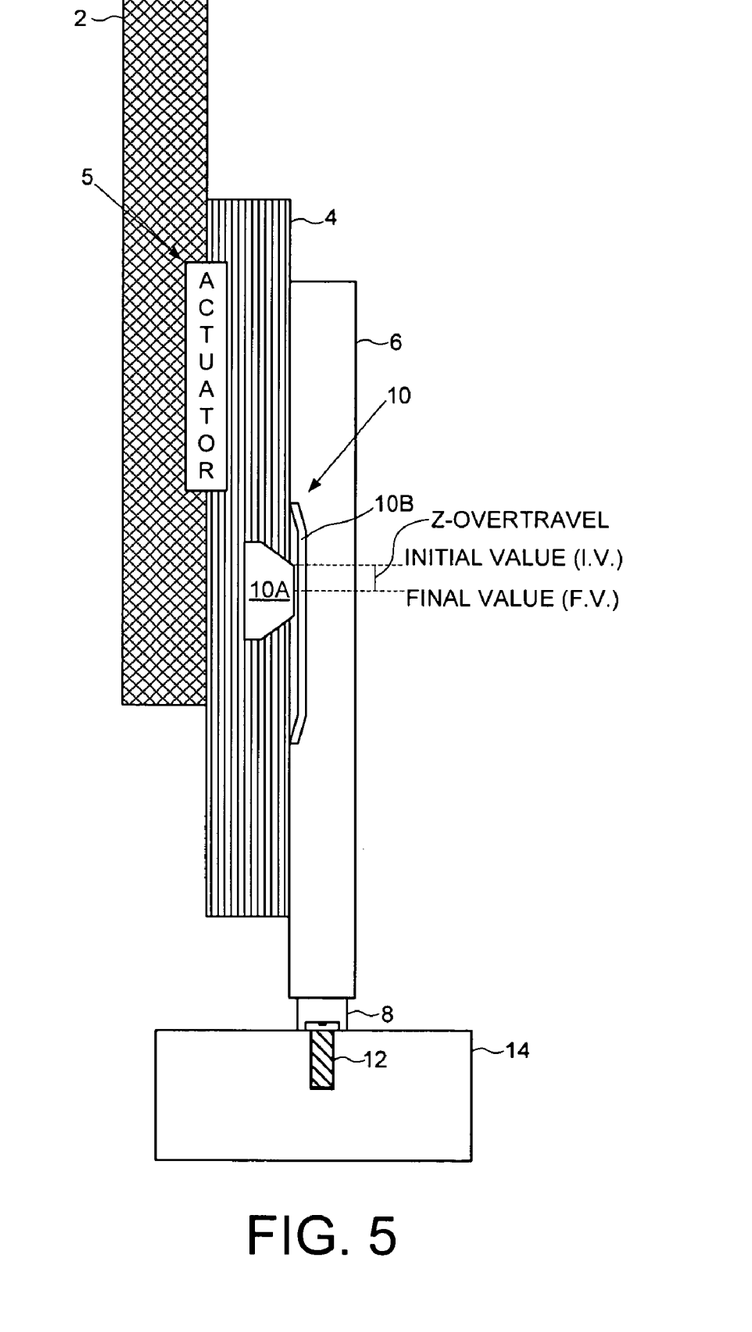
FIG. 5 shows a final position of the screw and corresponding encoder value used to verify the final position of the screw.

FIG. 4 illustrates, in one embodiment, an orientation of the carriage 4 and slider 6 during the high RPM angle step, wherein the encoder 10 generates an interim value. FIG. 5 illustrates, in one embodiment, the orientation of the carriage 4 and slider 6 at the end of the screw driving process wherein the encoder 10 generates a final value (F.V.). In one embodiment, the carriage 4 is moved relative to the base 2 and work surface 14 by a "z-overtravel" margin as illustrated in FIG. 5. The z-overtravel corresponds to a downward overtravel margin, that is, after initial contact between the screw 12 and the work surface 14, the carriage 4 moves downward the length of the screw 12 plus the z-overtravel margin. In one embodiment, the z-overtravel margin is selected to ensure the screw 12 will screw completely into the work surface 14, wherein the value selected for the z-overtravel margin may depend on the geometry of the screwdriver and the screw 12 (e.g., resolution of the carriage actuator 5, screw pitch, etc.).

In one embodiment, the F.V. of the encoder 10 is used to verify the final position of the screw 12 relative to the work surface 14. If the output of the encoder 10 does not substantially match a target F.V., an error condition is detected. Any suitable margin may be employed to determine whether the output of the encoder 10 substantially matches the target F.V., which may depend on the implementation of the encoder and the tolerances of the manufacturing process. For example, in one embodiment the encoder output may be found to match the target F.V. if it is within a suitably small percentage of the encoder's full range.

In one embodiment, the carriage 4 continues to move relative to the base 2 (e.g., downward in FIG. 4) during the high RPM angle step. In this embodiment, the carriage 4 is moved downward faster than the screw 12 is screwed into the work surface 14 (i.e., faster than the thread pitch times the RPM) to ensure the slider 6 will maintain a sufficient downward force on the screw 12.

Figure 7:
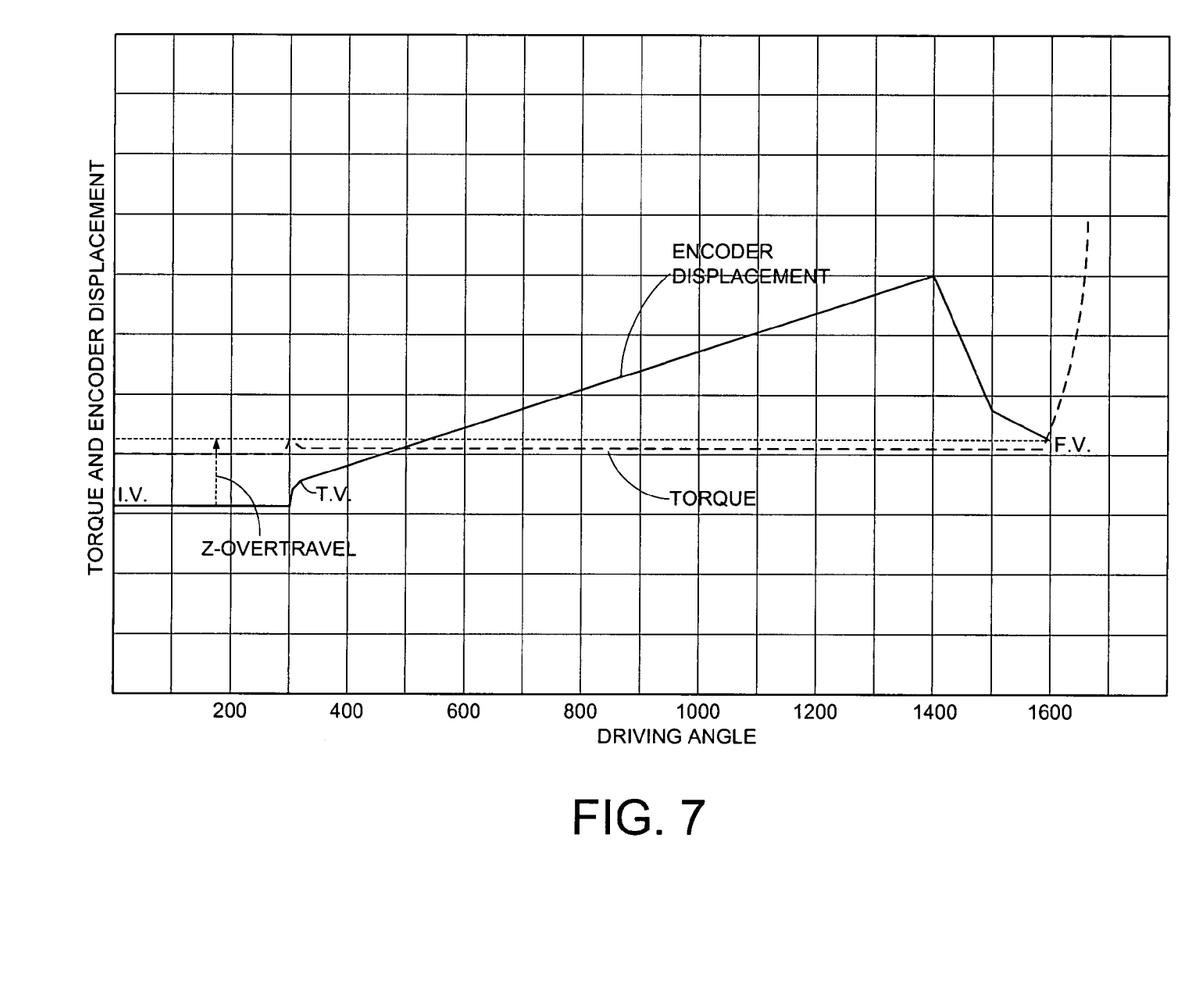
FIG. 7 illustrates the torque and encoder displacement during the low RPM search step, high RPM angle step, and medium RPM torque step.

FIG. 7 illustrates the torque and encoder displacement relative to the driving angle degrees during an example screw driving process. During the low RPM search step the screw 12 is moved toward the work surface, and the encoder 10 generates the I.V. (shown as 0 to ~300 degrees). As the screw 12 contacts the work surface, the output of the encoder 10 begins changing value, representing the relative movement between the slider 6 and carriage 4 (shown as ~300 to ~320 degrees). The slope of encoder displacement is relatively steep because the screw 12 is rotating at a low RPM, and indeed may not yet have engaged the work surface 14. Once the screw 12 engages and begins screwing into the work surface 14, there is a corresponding reduction in the encoder displacement slope. When the encoder 10 reaches the position T.V., the screwdriver transitions into the angle step and begins rotating the screw 12 at a high RPM as indicated by the further reduction in the encoder displacement slope.

At some point during the angle step (1,400 driving angle degrees in the example of FIG. 7), the carriage 4 reaches a final position (e.g., contacts a hard stop or reaches a terminal count of a stepping process). At this point the slider 6 reverses direction relative to the carriage 4 since the screw 12 continues to be screwed into the work surface 14 at the high RPM, as illustrated in FIG. 7. At a driving angle threshold (1,500 degrees in the example of FIG. 7), the screwdriver transitions into the torque step wherein the screw 12 is rotated at a medium RPM as indicated by the change in slope of the encoder displacement in FIG. 7. When the torque exceeds a predetermined final torque threshold, the screw 12 is assumed to have reached its final position, and the screwdriver stops turning the screw 12. The output of the encoder 10 is then compared to the target F.V. to verify that the screw 12 did in fact successfully screw into the work surface 14.

Figure 8A:
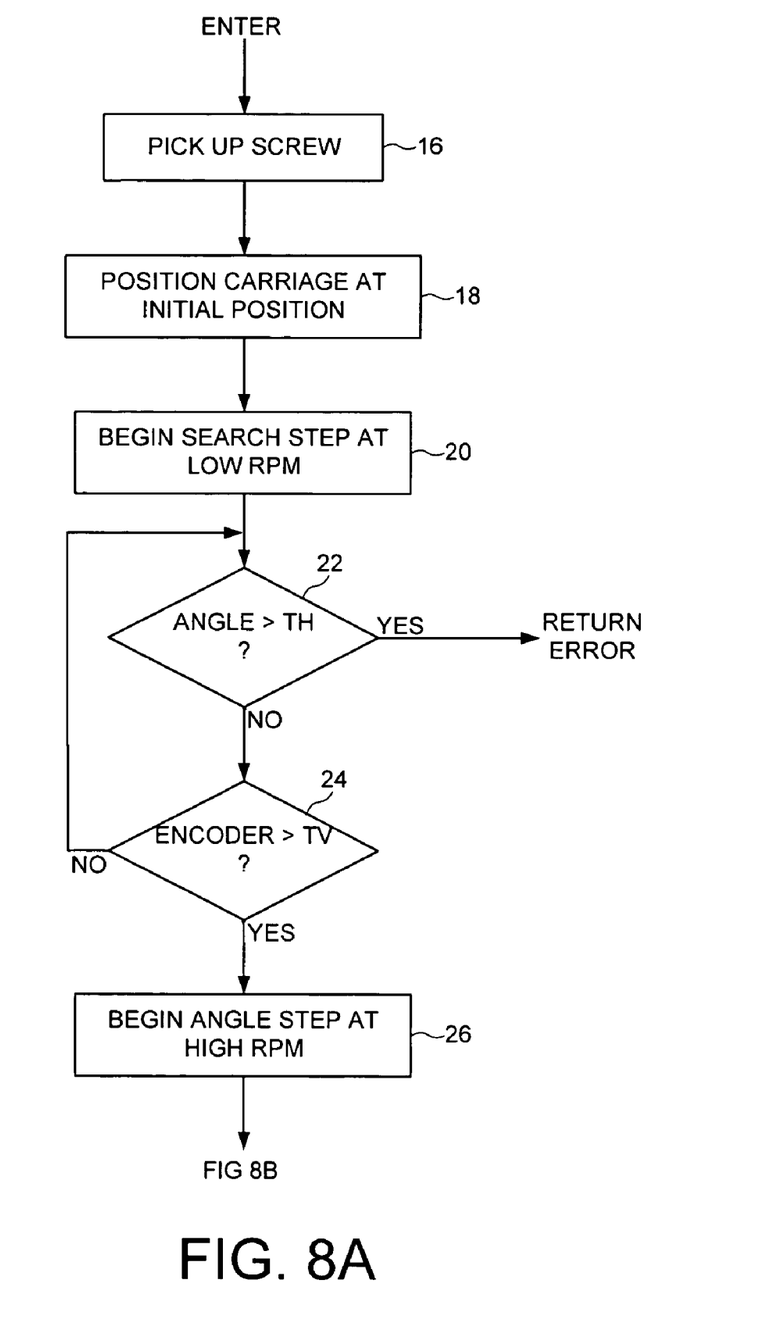
FIG. 8A is a flow diagram illustrating the low RPM search step of the screw driving process which transitions into the high RPM angle step when the encoder displacement exceeds a threshold.

FIG. 8A is a flow diagram illustrating the screw driving process according to an embodiment of the present invention. At step 16 the screwdriver picks up a screw and then at step 18 positions the carriage 4 at an initial position over the work surface 14. At step 20 the screw 12 is rotated at a low RPM during a search step in order to maintain a proper vertical alignment of the screw 12 while the screw 12 is moved toward the work surface 14. The search step terminates when the encoder 10 output exceeds the position T.V. at step 24, or if the driving angle exceeds a first error angle threshold at step 22 indicating an error condition. Once the encoder 10 output exceeds the position T.V. at step 24, indicating that the screw 12 has contacted the work surface 14, at step 26 the screw 12 is rotated at a high RPM during the angle step in order to screw the screw 12 into the work surface 14.

Figure 8B:
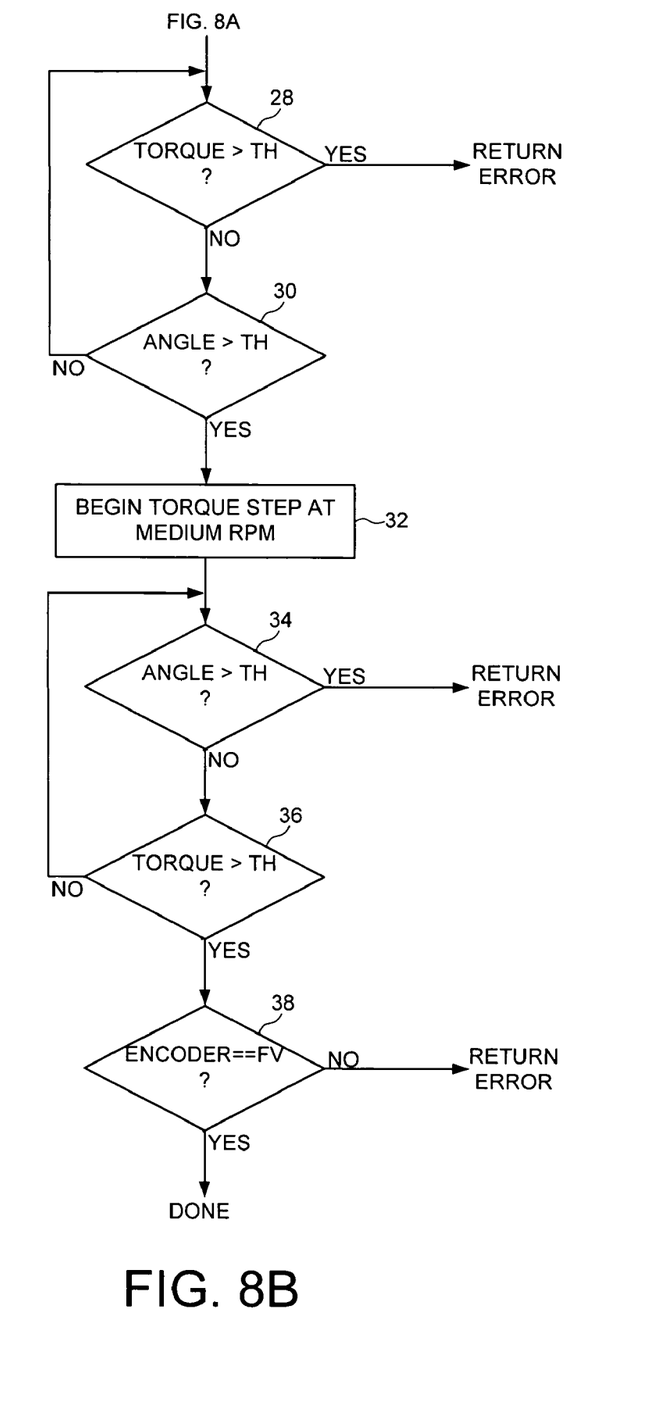
FIG. 8B is a flow diagram illustrating the transition into the medium RPM torque step after a predetermined number of driving angle degrees, and the step of verifying the final position of the screw relative to the work surface by evaluating the encoder displacement.

Continuing with FIG. 8B, if during the angle step the torque exceeds an error torque threshold at step 28, an error condition is detected. For example, the torque may exceed the error torque threshold at step 28 if there is a defect that causes the threads of the screw 12 to bind with the threads of the work surface 14. Otherwise, if at step 30 the driving angle exceeds a transition angle threshold, then at step 32 the screw is rotated at a medium RPM after transitioning into the torque step. If during the torque step the driving angle exceeds a second error angle threshold at step 34 before the torque exceeds a final torque threshold at step 36, then an error condition is detected. For example, the driving angle may exceed the second error angle threshold at step 34 if the threads of the screw 12 don't properly engage the threads of the work surface 14 (the screw 12 simply spins without screwing into the work surface 14). If at step 36 the torque exceeds the final torque threshold, then it is assumed the screw 12 has successfully screwed into the work surface 14. If at step 38 the output of the encoder 10 does not substantially match the target F.V., an error condition is detected. For example, the torque may exceed the final torque threshold at step 36 too early due to a defect in the screw 12 or the work surface 14. Therefore, the encoder 10 is used to verify the final position of the screw 12 relative to the work surface 14.

Any suitable value may be selected for the first error angle threshold at step 22 to detect when the driving angle indicates an error in the screw driving process. In one embodiment, the first error angle threshold is determined relative to the initial position of the carriage 4 and the length of the screw 12. In another embodiment, the first error angle threshold is determined during a calibration process wherein a number of driving angles are counted from the beginning of the search step 20 to when the screw 12 contacts the work surface 14. In yet another embodiment, a digital timer is employed at step 22 rather than track the number of driving angles.

Any suitable position T.V. may be employed at step 24 to transition into the high RPM angle step. In one embodiment, the position T.V. equals the smallest increment in the encoder displacement, such that the screwdriver transitions into the high RPM angle step as soon as possible after the screw 12 contacts the work surface 14. In another embodiment, the position T.V. equals a plurality of increments in the encoder displacement, for example, to ensure the screw 12 has actually contacted the work surface 14, or to help the screw 12 engage the work surface during the search step at the lower RPM before transitioning into the higher RPM angle step.

Any suitable value may be selected for the error torque threshold at step 28 to detect the error condition due to a defect in the screw 12 or work surface 14. In one embodiment, the error torque threshold is determined analytically by selecting a value relative to the known tolerances of the manufacturing materials. In another embodiment, the error torque threshold is determined by evaluating the detected failures and adjusting the error torque threshold accordingly. For example, the error torque threshold may be increased if too many false positives are detected during the screw driving process, or the error torque threshold may be decreased if too many parts fail a final quality test.

Any suitable value may be selected for the transition angle threshold at step 30 to detect when to transition into the medium RPM torque step. In one embodiment, the transition angle threshold is selected relative to the length of the screw and screw pitch, as well as their tolerances. In another embodiment, the transition angle threshold may be adjusted to optimize the screw driving process by minimizing the manufacturing time balanced against the number of parts that fail a final quality test. For example, if the number of parts failing the final quality test exceeds a threshold, the transition angle threshold may be decreased so that the medium RPM torque step is entered sooner. In one embodiment, the transition angle threshold may be compared to a count of the number of driving angles since the beginning of the screw driving process. In another embodiment, the transition angle threshold may be compared to a count of the number of driving angles since the beginning of the angle step. In still another embodiment, the transition angle threshold may be compared to a count of the number of driving angles since a change in the slope of driving angle vs. encoder displacement (as shown in FIG. 7).

The second error angle threshold at step 34 for detecting if the threads of the screw 12 properly engage the threads of the work surface 14 may be set to any suitable value. In one embodiment, the second error threshold is determined analytically relative to the length of the screw 12 and the screw pitch. In another embodiment, the second error angle threshold is determined during a calibration procedure wherein a screw 12 is screwed into the work surface 14 using the medium RPM of the torque step while counting the number of driving angle degrees. The second error angle threshold is then selected relative to the final count, for example, by adding or subtracting a suitable margin. In one embodiment, the second error angle threshold may be compared to a count of the number of driving angles since the beginning of the screw driving process. In another embodiment, the second error angle threshold may be compared to a count of the number of driving angles since the beginning of the angle step, or since the beginning of the torque step. In still another embodiment, the second error angle threshold may be compared to a count of the number of driving angles since a change in the slope of driving angle vs. encoder displacement (as shown in FIG. 7).

Any suitable value may be selected for the final torque threshold at step 36 for detecting when the screw 12 has finished screwing into the work surface 14. In one embodiment, the final torque value is selected relative to the tolerances of the manufacturing materials and/or the specifications of the part being manufactured. In another embodiment, the final torque value may be optimized over a number of manufacturing cycles, for example, to optimize the number of parts that pass a final quality test.

The target F.V. that corresponds to the final position of the screw 12 at step 38 may be determined in any suitable manner. In one embodiment, the target F.V. is determined analytically relative to the known geometries of the screw 12, the work surface 14, and the encoder 10. In another embodiment, the target F.V. is determined during a calibration procedure wherein a screw 12 is screwed into the work surface 14 and the final position verified independent of the encoder 10 (e.g., verifying the final position visually), wherein, once verified, the output of the encoder 10 is selected as the target F.V. for use in the normal manufacturing process.

In one embodiment, the encoder 10 is used to verify that the screw 12 has actually engaged and is screwing down into the work surface 14 before transitioning into the high RPM angle step. For example, in one embodiment the encoder 10 may be evaluated to verify that the encoder displacement is changing consistent with the screw 12 being screwed into the work surface 14 (at a rate substantially equal to the movement of the carriage minus the thread pitch times the low RPM). In another embodiment, after the position detector 10 detects contact with the work surface 14, transitioning into the high RPM angle step is delayed by a predetermined interval, for example, by waiting a predetermined number of driving angle degrees.

The encoder 10 may also be used to detect the movement of the slider 6 relative to the carriage 4 for any other suitable purpose during the screw driving process. For example, the encoder 10 output may be compared to a threshold at step 30 of FIG. 8B to transition into the medium RPM torque step rather than by comparing the driving angle to a threshold. In another embodiment, the encoder 10 is used at step 36 to detect when the screw driving process has terminated successfully rather than by comparing the torque to a threshold. This embodiment may, for example, reduce the cost of the screwdriver by eliminating the torque transducer.

We claim:

1. A screwdriver comprising:
   (a) a base;
   (b) a carriage moveably coupled to the base along a first axis;
   (c) an actuator operable to move the carriage relative to the base;
   (d) a slider comprising an attached screw bit, wherein:
      the slider is coupled to the base through the carriage; and
      the slider is moveably coupled to the carriage such that the slider and attached screw bit move together along the first axis relative to the carriage; and
   (e) a position detector operable to detect a position of the slider relative to the carriage.

2. The screwdriver as recited in claim 1, wherein the position detector comprises an encoder.

3. The screwdriver as recited in claim 2, wherein the encoder comprises a first component coupled to the carriage and a second component coupled to the slider.

4. The screwdriver as recited in claim 2, wherein:
   the encoder comprises an emitter operable to emit light and a detector operable to detect the light, the emitter and detector coupled to the carriage; and
   the slider comprises a pattern operable to reflect the light.

5. The screwdriver as recited in claim 2, wherein:
   the encoder comprises an emitter operable to emit light and a detector operable to detect the light, the emitter and detector coupled to the slider; and
   the carriage comprises a pattern operable to reflect the light.

6. The screwdriver as recited in claim 1, further comprising a torque transducer for measuring a torque applied to the screw bit.

7. The screwdriver as recited in claim 1, further comprising an angle transducer for measuring a driving angle of the screw bit.

8. A method of operating a screwdriver to fasten a screw to a work surface, the screwdriver comprising a base, a carriage moveably coupled to the base along a first axis, an actuator operable to move the carriage relative to the base, a slider comprising an attached screw bit, wherein the slider is coupled to the base through the carriage and the slider is moveably coupled to the carriage such that the slider and attached screw bit move together along the first axis relative to the carriage, and a position detector operable to detect a position of the slider relative to the carriage, the method comprising:

moving the carriage relative to the base to move the screw towards the work surface; and     detecting relative movement between the slider and the carriage using the position detector.

9. The method as recited in claim 8, further comprising, after the screw contacts the work surface, moving the carriage further relative to the base causing the slider to move relative to the carriage.

10. The method as recited in claim 9, wherein:

moving the carriage relative to the base to move the screw toward the work surface further comprises rotating the screw bit at a first angular velocity; and     after the position detector indicates a target displacement between the carriage and the slider, further comprising rotating the screw bit at a second angular velocity greater than the first angular velocity.

11. The method as recited in claim 9, further comprising:

measuring a driving angle of the screw bit; and detecting an error condition if the driving angle exceeds a first angle error threshold before the screw contacts the work surface.

12. The method as recited in claim 11, further comprising:

measuring a torque applied to the screw bit; and detecting an error condition if the torque exceeds an error torque threshold before the driving angle exceeds a transition angle threshold.

13. The method as recited in claim 12, wherein:

moving the carriage relative to the base to move the screw toward the work surface further comprises rotating the screw bit at a first angular velocity;

after the position detector indicates a target displacement between the carriage and the slider, further comprising rotating the screw bit at a second angular velocity greater than the first angular velocity; and     after the driving angle threshold exceeds the transition angle threshold, further comprising rotating the screw bit at a third angular velocity less than the second angular velocity.

14. The method as recited in claim 13, further comprising detecting an error condition if the driving angle exceeds a second angle error threshold before the torque exceeds a final torque threshold.

15. The method as recited in claim 13, further comprising:

stopping the rotation of the screw bit if the torque exceeds a final torque threshold; and     evaluating a signal from the position detector to verify a final position of the screw relative to the work surface.

16. The method as recited in claim 8, further comprising, after screwing the screw into the work surface, evaluating a signal from the position detector to verify a final position of the screw relative to the work surface.

\* \* \* \* \*